(12) United States Patent
Holden et al.

(10) Patent No.: US 6,411,655 B1
(45) Date of Patent: Jun. 25, 2002

(54) SYSTEMS AND METHODS FOR CONVERTING A STREAM OF COMPLEX NUMBERS INTO AN AMPLITUDE AND PHASE-MODULATED RADIO POWER SIGNAL

(75) Inventors: Alan R. Holden, Apex; Paul W. Dent, Pittsboro; William O. Camp, Jr., Chapel Hill, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/216,466

(22) Filed: Dec. 18, 1998

(51) Int. Cl.[7] .................................................. H03C 1/00

(52) U.S. Cl. ....................... 375/269; 375/279; 375/297; 332/103

(58) Field of Search ................................ 375/261, 262, 375/263, 269, 257, 258, 279, 297, 298; 330/10; 332/145, 112, 103

(56) References Cited

U.S. PATENT DOCUMENTS

| | | | |
|---|---|---|---|
| 2,210,028 A | 8/1940 | Doherty | |
| 3,448,366 A | 6/1969 | Goff | 363/43 |
| 3,777,275 A | 12/1973 | Cox | 330/10 |
| 3,805,139 A | 4/1974 | Hoffman, Jr. et al. | 321/5 |
| 3,906,401 A | 9/1975 | Seidel | 332/18 |
| 3,909,742 A | 9/1975 | Cox et al. | 330/84 |
| 3,927,379 A | 12/1975 | Cox et al. | 330/10 |
| 4,090,147 A | 5/1978 | Seidel | 330/10 |
| 4,095,196 A | 6/1978 | Seidel | 332/16 T |
| 4,178,557 A | 12/1979 | Henry | 330/10 |
| 4,315,107 A | 2/1982 | Ciesielka et al. | 179/16 F |

(List continued on next page.)

FOREIGN PATENT DOCUMENTS

| | | | |
|---|---|---|---|
| EP | 0 471 346 A1 | 2/1992 | H03F/3/60 |
| EP | 0 598 585 A2 | 5/1994 | H03F/1/32 |
| EP | 0 708 546 A2 | 4/1996 | H04L/27/34 |
| EP | 0 725 478 A1 | 8/1996 | H03F/3/217 |
| GB | 2 267 402 A | 12/1993 | H03L/7/00 |
| WO | WO 97/48219 | 12/1997 | H04L/27/34 |
| WO | WO 99/55206 | 10/1999 | H03F/3/217 |

OTHER PUBLICATIONS

International Search Report, PCT/US99/27008, Feb. 24, 2000.

U.S. patent application Ser. No. 09/054,063, Dent, filed Apr. 2, 1998.

(List continued on next page.)

*Primary Examiner*—Chi Pham
*Assistant Examiner*—Dung X. Nguyen
(74) *Attorney, Agent, or Firm*—Myers Bigel Sibley & Sajovec (57) ABSTRACT

A stream of complex numbers is converted into polar form, including an amplitude-representative part and a phase-representative part. The amplitude-representative part of each of the converted complex numbers is represented as a plurality of digits of decreasing numerical significance. The phase-representative part of each of the converted complex numbers is phase-modulated at the radio carrier frequency to produce a phase-modulated drive signal. The phase-modulated drive signal is amplified in a plurality of power amplifiers. A respective one of the power amplifiers provides a maximum output power level at a respective amplifier output that is related to a respective one of the decreasing numerical significance. The output amplitude of a respective one of the plurality of power amplifiers is controlled by applying a respective one of the plurality of digits of decreasing numerical significance to a respective one of the plurality of power amplifiers. The amplifier outputs of the plurality of power amplifiers are combined to form the modulated radio power signal.

60 Claims, 5 Drawing Sheets

U.S. PATENT DOCUMENTS

| | | | |
|---|---|---|---|
| 4,323,731 A | 4/1982 | Hershberger | 179/1 GS |
| 4,420,723 A | 12/1983 | de Jager | 330/10 |
| 4,433,312 A | 2/1984 | Kahn | 332/22 |
| 4,485,357 A | 11/1984 | Voorman | 332/17 |
| 4,509,017 A | 4/1985 | Andren et al. | 329/105 |
| 4,580,111 A | 4/1986 | Swanson | 332/41 |
| 4,672,634 A | 6/1987 | Chung et al. | 375/62 |
| 4,700,390 A | 10/1987 | Machida | 381/29 |
| 4,791,815 A | 12/1988 | Yamaguchi et al. | 73/1.37 |
| 4,862,116 A | 8/1989 | Olver | 332/23 R |
| 5,077,539 A | 12/1991 | Howatt | 330/10 |
| 5,086,450 A | 2/1992 | Kitagawa et al. | 379/40 |
| 5,365,187 A | 11/1994 | Hornak et al. | 330/10 |
| 5,410,280 A | 4/1995 | Linguet et al. | 332/149 |
| 5,420,541 A | 5/1995 | Upton et al. | 330/286 |
| 5,438,301 A | 8/1995 | Havens et al. | 331/45 |
| 5,453,717 A | 9/1995 | Gerfault | 330/146 |
| 5,483,433 A | 1/1996 | Yang | 363/43 |
| 5,483,681 A | 1/1996 | Bergsten et al. | 455/126 |
| 5,559,468 A | 9/1996 | Gailus et al. | 330/110 |
| 5,568,088 A | 10/1996 | Dent et al. | 330/151 |
| 5,574,967 A | 11/1996 | Dent et al. | 455/12.1 |
| 5,612,651 A | 3/1997 | Chethik | 332/103 |
| 5,631,604 A | 5/1997 | Dent et al. | 330/124 R |
| 5,638,024 A | 6/1997 | Dent et al. | 330/84 |
| 5,682,303 A | 10/1997 | Goad | 363/71 |
| 5,694,093 A | 12/1997 | DaSilva et al. | 332/103 |
| 5,719,527 A * | 2/1998 | Bateman et al. | 330/10 |
| 5,732,333 A | 3/1998 | Cox et al. | 455/126 |
| 5,734,565 A | 3/1998 | Mueller et al. | 363/132 |
| 5,767,750 A | 6/1998 | Yamaji | 332/103 |
| 5,778,028 A | 7/1998 | Kaufmann | 375/296 |
| 5,815,531 A | 9/1998 | Dent | 375/298 |
| 5,900,778 A | 5/1999 | Stonick et al. | 330/149 |
| 5,930,128 A | 7/1999 | Dent | 363/43 |
| 5,990,734 A * | 11/1999 | Wright et al. | 330/2 |
| 6,133,788 A * | 10/2000 | Dent | 330/124 R |
| 6,194,963 B1 * | 2/2001 | Camp, Jr. et al. | 330/149 |
| 6,204,735 B1 | 3/2001 | Cairns | 332/119 |
| 6,219,088 B1 | 4/2001 | Liu et al. | 348/21 |

OTHER PUBLICATIONS

U.S. patent application Ser. No. 09/054,060, Dent, filed Apr. 2, 1998.

Chireix, "High Power Outphasing Modulation," Proceedings of the Institute of Radio Engineers, vol. 23, No. 11, Nov. 1935, pp. 1370–1392.

U.S. patent application Ser. No. 09/209,104, Dent, filed Dec. 10, 1998.

U.S. patent application Ser. No. 09/208,912, Dent et al., filed Dec. 10, 1998.

International Search Report, PCT/US99/24332, Feb. 24, 2000.

Morais et al., NLA–QAM: A Method for Generating High–Power QAM Signals Through Nonlinear Amplification, IEEE Transactions on Communications, Vol. Com–30, No. 3, Mar. 1982, pp. 517–522.

International Search Report, PCT/US99/05681, Jul. 6, 1999.

International Search Report, PCT/US99/26913, Jul. 24, 2000.

* cited by examiner

SYSTEMS AND METHODS FOR CONVERTING A STREAM OF COMPLEX NUMBERS INTO AN AMPLITUDE AND PHASE-MODULATED RADIO POWER SIGNAL

FIELD OF THE INVENTION

This invention relates to modulation systems and methods and more particularly to systems and methods that can efficiently modulate a signal onto a radio frequency carrier.

BACKGROUND OF THE INVENTION

Modulation systems and methods are widely used in transmitters to modulate information including voice and/or data onto a carrier. The carrier may be a final carrier or an intermediate carrier. The carrier frequency can be in UHF, VHF, RF, microwave or any other frequency band. Modulators are also referred to as "mixers" or "multipliers". For example, in a mobile radiotelephone, a modulator is used in the radiotelephone transmitter.

In modern radiotelephone communications, mobile radiotelephones continue to decrease in size, cost and power consumption. In order to satisfy these objectives, it is generally desirable to provide modulation systems and methods that can provide high power modulation while reducing the amount of battery power that is consumed. Unfortunately, the power amplifier of a modulator may consume excessive power due to efficiency limitations therein. More specifically, it is known to provide linear Class-A or Class-AB power amplifiers that may have efficiencies as low as 30% or less. Thus, large amounts of battery power may be wasted as heat.

In modulation systems and methods, it is known to provide a desired modulation of a radio signal as a stream of complex numbers including a real part and an imaginary part. Such a stream of complex numbers may be generated by a digital signal processor in a radiotelephone. Systems and methods for modulating a stream of complex numbers are described in U.S. Pat. No. 5,815,531 to the present co-inventor Dent entitled "Transmitter for Encoded Data Bits", assigned to the assignee of the present invention, the disclosure of which is hereby incorporated herein by reference.

As described in the '531 patent, Quadrature Amplitude Modulated signals are generated from data bits by using a first Quadrature Phase Shift Keying (QPSK) modulator for encoding a first pair of the data bits into one of four carrier signal phases, thereby producing a first QPSK signal. A second QPSK modulator encodes a second pair of the data bits into one of four carrier signal phases, thereby producing a second QPSK signal. The first QPSK signal is amplified to a first power level, and the second QPSK signal is amplified to a second power level. The first and second amplified signals are then combined to produce a signal in which four data bits are encoded. Offset Quadrature Phase Shift Keying (OQPSK) may be used in place of the first and second QPSK modulators, so that an Offset Quadrature Amplitude Modulation (OQAM) transmitter is formed. An OQPSK modulator encodes data bits by encoding a first sub-group of the data bits into a real part of a complex signal at an odd instant of a clock, and by encoding a second sub-group of the data bits into an imaginary part of the complex signal at an even instant of the clock. OQPSK modulation provides the benefit of having all signal transitions being constrained to trajectories around constant radius circles, thereby producing spectral efficiency. See the '531 patent abstract.

Notwithstanding the improvements of the above described patent, there continues to be a need for improved methods and systems for converting a stream of complex numbers representing a desired modulation of a radio signal into a modulated radio power signal at a radio carrier frequency. Preferably, these systems and methods can perform conversion at high efficiencies so that the size, cost and/or power consumption of the modulation system may be reduced.

SUMMARY OF THE INVENTION

It is therefore an object of the present invention to provide improved modulation systems and methods.

It is another object of the present invention to provide modulation systems and methods that can provide high efficiency.

It is yet another object of the present invention to provide modulation systems and methods that can modulate a stream of complex numbers representing a desired modulation of a radio signal, at high efficiency.

These and other objects are provided, according to the present invention, by converting a stream of complex numbers into polar form, including an amplitude-representative part and a phase-representative part. The amplitude-representative part of each of the converted complex numbers is represented as a plurality of digits of decreasing numerical significance. The phase-representative part of each of the converted complex numbers is phase-modulated at the radio carrier frequency to produce a phase-modulated drive signal. The phase-modulated drive signal is amplified in a plurality of power amplifiers. A respective one of the power amplifiers provides a contribution to a modulated radio power signal at a respective amplifier output, that is related to a respective one of the digits of decreasing numerical significance. The output amplitude of a respective one of the plurality of power amplifiers is controlled by applying a respective one of the plurality of digits of decreasing numerical significance to a respective one of the plurality of power amplifiers. The amplifier outputs of the plurality of power amplifiers are combined to form the modulated radio power signal.

The output levels of the plurality of power amplifiers may be combined using various techniques. For example, a respective output power level may be applied to a primary winding of a respective one of a plurality of transformers, the secondary windings of which are series coupled to produce the modulated radio power signal. Alternatively, a respective output power level may be applied to a respective quarter wave transmission line, and the quarter wave transmission lines may be coupled to one another to produce the modulated radio power signal.

The digits may be binary digits such that the amplitude of a respective one of the plurality of amplifiers is controlled by turning a respective one of the plurality of power amplifiers on or off by applying a respective one of the plurality of digits of decreasing numerical significance to a respective one of the plurality of power amplifiers, the output impedance of an "off" amplifier being arranged to be zero or very low. The amplitude-representative parts of the complex numbers may have both positive and negative values. In this case, the output amplitude of a respective one of the plurality of power amplifiers is controlled to be either a maximum positive amplitude or a maximum negative amplitude by applying a respective one of the plurality of digits of decreasing numerical significance to a respective one of the plurality of power amplifiers.

Alternatively, the digits may be ternary digits. Then, the output amplitude of a respective one of the plurality of power amplifiers may be controlled to be either a maximum positive amplitude, a maximum negative amplitude or zero by applying a respective one of the plurality of ternary digits of decreasing numerical significance to a respective one of the plurality of power amplifiers. When zero is selected, the output impedance of the amplifier is arranged to be zero or very low.

According to another aspect of the present invention, the stream of complex numbers is converted into polar form including an amplitude-representative part and a phase-representative part. The amplitude-representative part is represented as a plurality of digits of decreasing numerical significance. The phase-representative part of each of the converted complex numbers is modulated at the radio carrier frequency, to produce a phase-modulated drive signal. The phase-modulated drive signal is power-amplified in a plurality of power amplifiers. A respective power amplifier provides an output voltage level at a respective amplifier output. A respective one of the plurality of digits of decreasing numerical significance is applied to a respective one of the plurality of power amplifiers to thereby control the output amplitude of a respective one of the plurality of power amplifiers. The amplifier outputs of the plurality of power amplifiers are combined according to a combining ratio to produce the modulated radio power signal. Either the output voltage levels or the combining ratio or both are selected such that the modulated radio power signal is related to the numerical significance of the plurality of digits.

In a first embodiment, each of the power amplifiers produces the same output voltage level and the combining ratio is selected such that the outputs of the power amplifiers are combined according to a ratio that is related to the numerical significance of the digits that are associated with the respective power amplifier. In another alternative, the combining ratio is unity and the output voltage level of a respective power amplifier is related to the numerical significance of the digits that are associated therewith. In yet another alternative, both the amplifier output level and combining ratio are selected such that the modulated radio power signal is related to the numerical significance of the plurality of digits. The amplifier outputs may be combined as was described above. The digits may be binary digits or ternary digits as was described above.

Accordingly, the present invention can convert the stream of complex numbers representing a desired modulation of a radio signal into an amplitude and phase-modulated radio power signal at a radio carrier frequency at high efficiency. Reduced size, cost and/or power consumption of a mobile radiotelephone or other transmitter may be obtained. Power modulation systems and methods may be provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will be understood that when an element is referred to as being "coupled" to another element, it can be directly coupled to the other element or intervening elements may also be present.

As will be appreciated by one of skill in the art, the present invention may be embodied as systems (apparatus) or methods. The present invention may take the form of an entirely hardware embodiment or an embodiment combining software and hardware aspects. Accordingly, individual blocks and combinations of block in the drawings support combinations of means for performing the specified functions and combinations of steps for performing the specified functions. Each of the blocks of the drawings, and combinations of blocks of the drawings, may be embodied in many different ways, as is well known to those of skill in the art.

The present invention uses multiple saturated power amplifiers to approximate a linear power amplifier. A linear power amplifier generally has poor efficiency for delivering power from the power source to the load. Communication systems which use linear modulation techniques generally use linear power amplification in transmitters. A more efficient system to generate the transmit signal is to use a discrete number of saturated power amplifiers (controlled through a digital bus) to approximate the amplitude portion of the modulated signal. The phase portion of the signal can be modulated using standard techniques. The saturated power amplifier generally has a greater efficiency than the linear case.

Thus, a plurality of radio frequency power amplifiers, designed to operate efficiently at successively diminishing saturated power levels, have their outputs combined such that substantially the same current waveform flows in the output power amplifier devices of all amplifiers. The combined signal is output to a load, such as an antenna, preferably via suitable harmonic suppression filtering.

The drive signal to each amplifier is provided by the output of a phase modulator, while each amplifier is enabled to produce a full amplitude signal or no signal, for example by connecting its supply voltage connection to the supply voltage or alternatively to ground according to the value of an associated amplitude control bit. The set of amplitude control bits forms a binary word representative of the amplitude and is generated by a circuit such as a digital logic circuit in synchronism with the phase modulation values supplied to the phase modulator. The phase modulator can be a quadrature modulator, a direct digital synthesizer, a fractional-N synthesizer with modulation capability, or other conventional phase modulator.

In another embodiment, each amplifier is controlled to produce a full amplitude output signal or a phase inverted output signal by means of an associated phase inverting control bit. The set of phase inverting bits form a bipolar numerical representation of the instantaneous amplitude. In this embodiment, a vector trajectory through the origin, which causes an instantaneous inversion in sign, is affected by changing the amplitude from a positive value through zero to a negative value while the phase applied to the phase modulator remains relatively flat, thus reducing and preferably eliminating the need for instantaneous phase changes in the phase modulator. Likewise, when a vector transitions close to the origin, the trajectory may be synthesized using an amplitude sign change in order to reduce the rate of change of phase.

A digital signal processor computes successive complex vectors at a given sampling rate, the succession of vectors defining a complex modulation waveform representative of an information signal to be modulated. Each complex vector is converted to a phase value and an amplitude value, selecting between the two choices of a positive amplitude with an unmodified phase value or a negative amplitude combined with a phase value modified by 180 degrees in the second embodiment, in order to produce a succession of phase values that can more easily be tracked by a phase-lock-loop phase filter. When the information modulation comprises digital data bit streams, the succession of phase and amplitude values corresponding to different data bit sequences can be precomputed and stored in a look-up table.

In one embodiment, the amplifiers are combined with the aid of isolating transformers which allow the amplifier output signals to be effectively connected in series with the load. In a second embodiment, the amplifiers are combined by means of quarter wave lines. These combining techniques also are illustrated in application Ser. No. 09/054,063, filed Apr. 2, 1998, entitled "Hybrid Chireix/Doherty Amplifiers and Methods" to the present co-inventor Dent assigned to the assignee of the present invention, the disclosure of which is hereby incorporated herein by reference, and application Ser. No. 09/054,060, filed Apr. 2, 1998 entitled "Power Waveform Synthesis Using Bilateral Devices" to the present co-inventor Dent, assigned to the assignee of the present invention, the disclosure of which is hereby incorporated herein by reference.

Figure 1:
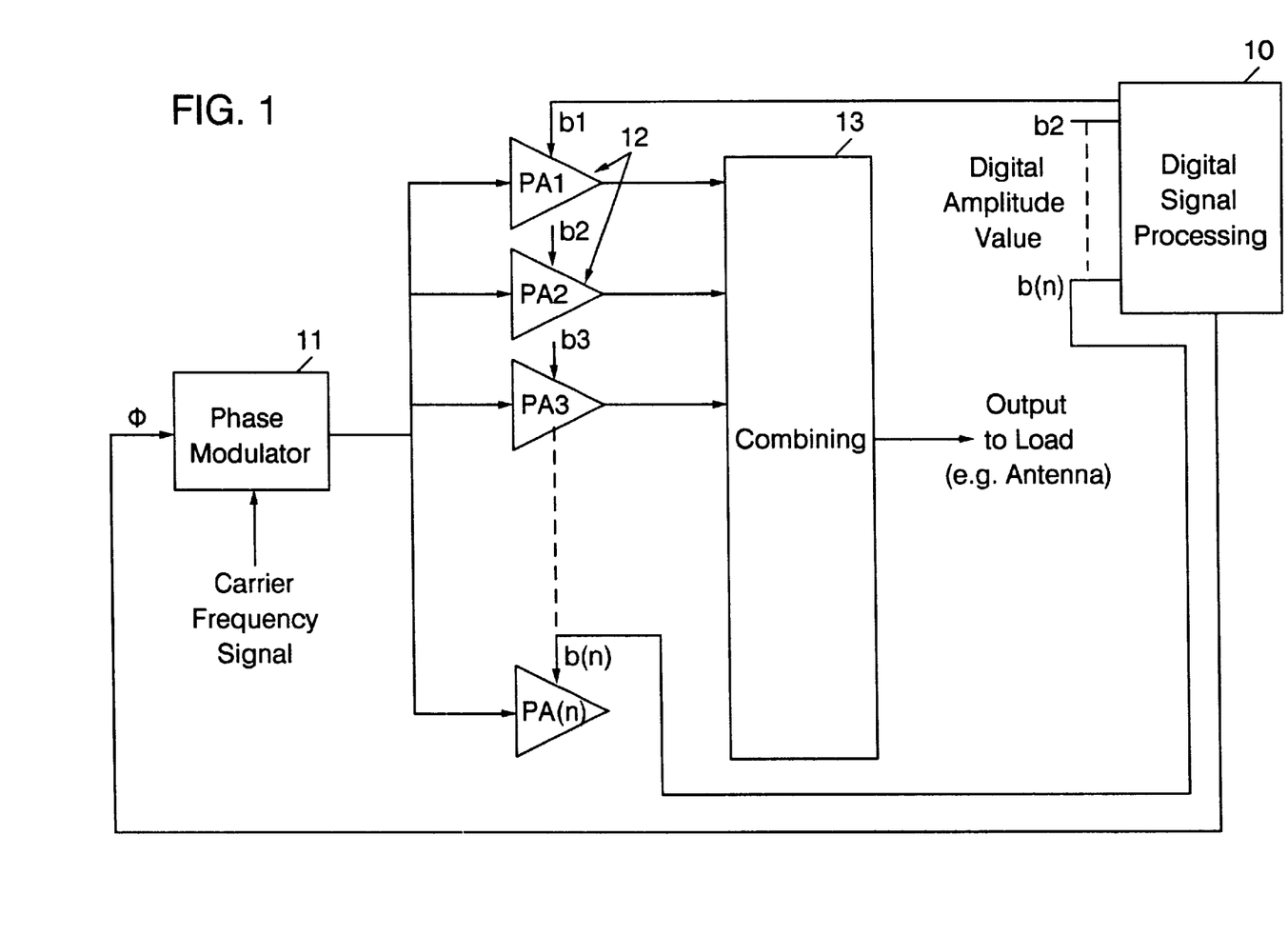
FIG. 1 is a block diagram illustrating systems and methods for converting a stream of complex numbers into a modulated radio power signal at a radio carrier frequency according to the present invention.

Referring now to FIG. 1, a processor such as a Digital Signal Processor (DSP) 10 supplies a sequence of phase values $\phi$ together with sequences of each of a number 'n' of amplitude control bits b1, b2 . . . b(n).

The phase sequence $\phi$ is applied to a phase modulator 11 along with a carrier frequency signal, to phase modulate the carrier frequency signal. The phase modulated carrier frequency signal from the phase modulator 11 drives the 'n' power amplifiers 12. Each amplitude control bit, b(i), connects to a respective power amplifier PA(i) of the 'n' power amplifiers 12 and controls its output signal amplitude to vary between two values in dependence on the value of b(i).

Figures 5A, 5B, 5C:
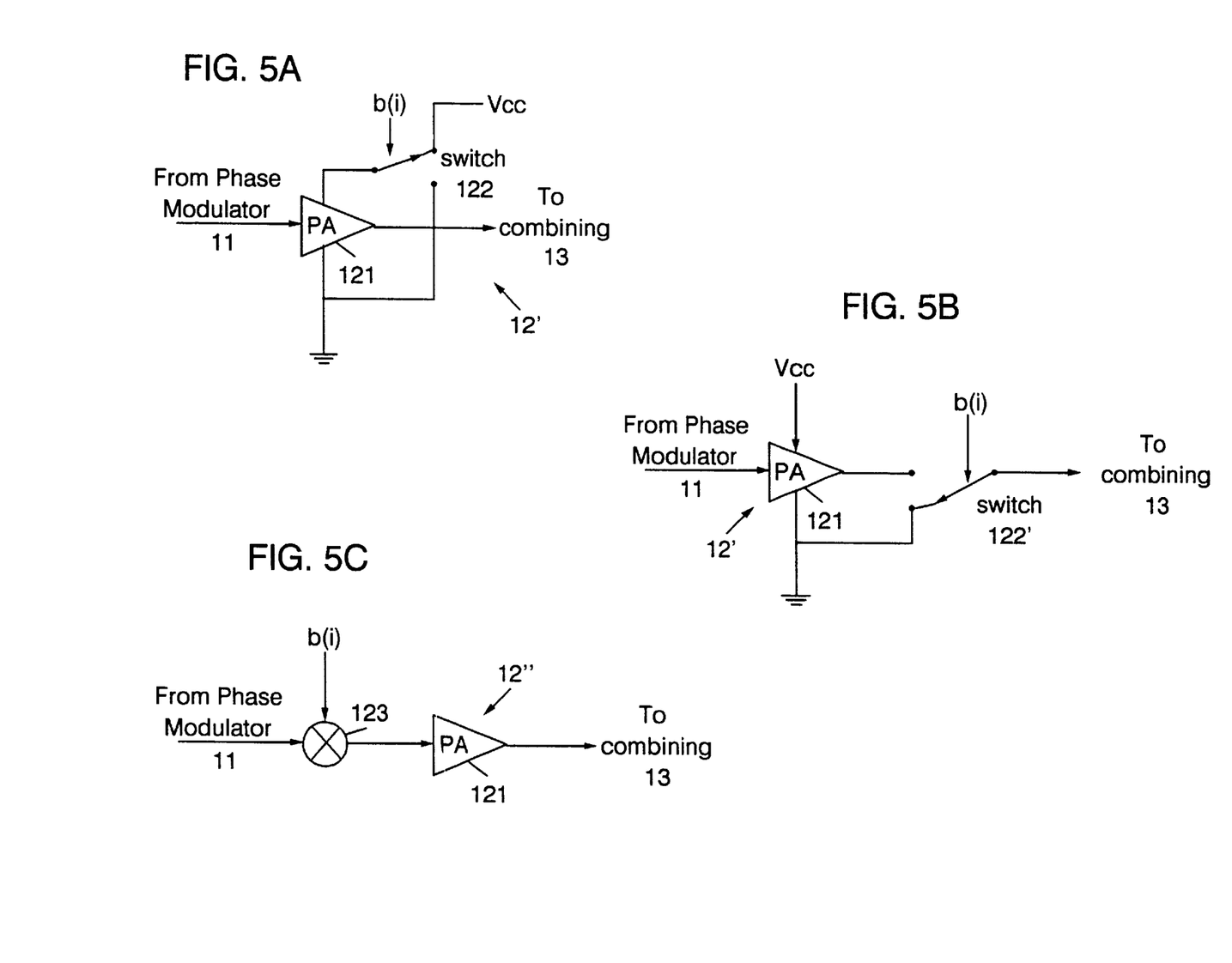
FIGS. 5A–5C are block diagrams of alternate embodiments of power amplifiers of FIGS. 1–3.

In one implementation, using unipolar control in which the amplitude is considered always to be positive, the two values of output amplitude that can be generated by a power amplifier 12 are respectively a full amplitude signal or zero. As shown in FIG. 5A, this can for example be achieved by switching the power amplifier on and off by disconnecting it from the DC power supply Vcc using a switch 122. To obtain highest efficiency, the switch 122 of FIG. 5A should preferably connect the power amplifier supply line to ground when it is not connected to the power supply, in order to allow current to continue to flow in the amplifier device output terminals.

FIG. 5B shows another on-off control technique, using a fast-operating switch such as a PIN diode switch 122' to disconnect the output terminal from power amplifier 121 and to connect it to ground instead. The now open circuit amplifier can, with proper design, consume minimal current from the power supply Vcc when its load is removed, yet current still can flow through the PIN diode switch 122 between the output terminal and ground.

Referring again to FIG. 1, 'n' power amplifiers 12 are designed to generate signal amplitude contributions for combining that lie in the binary ratios 1:0.5:0.25 . . . and the control bits b(1) . . . b(n) supplied by DSP 10 form a binary word describing the amplitude $$1.b(1)+0.5*b(2)+0.25*b(3) \ldots$$

The combining circuit 13 combines the outputs of all power amplifiers 12, for example by voltage addition, to obtain in that case a combined signal $(b(1)+0.5*b(2)+0.25*b(3) \ldots )e^{j(wt+\phi)}$, where 100 is the desired signal phase, 'w' is the desired radio carrier frequency and the amplitude is as given by the binary word (b1b2b3 . . . b(n)). In this way, the DSP 10 has direct binary digital control over the amplitude and also control over the phase via the phase modulator.

Figure 2:
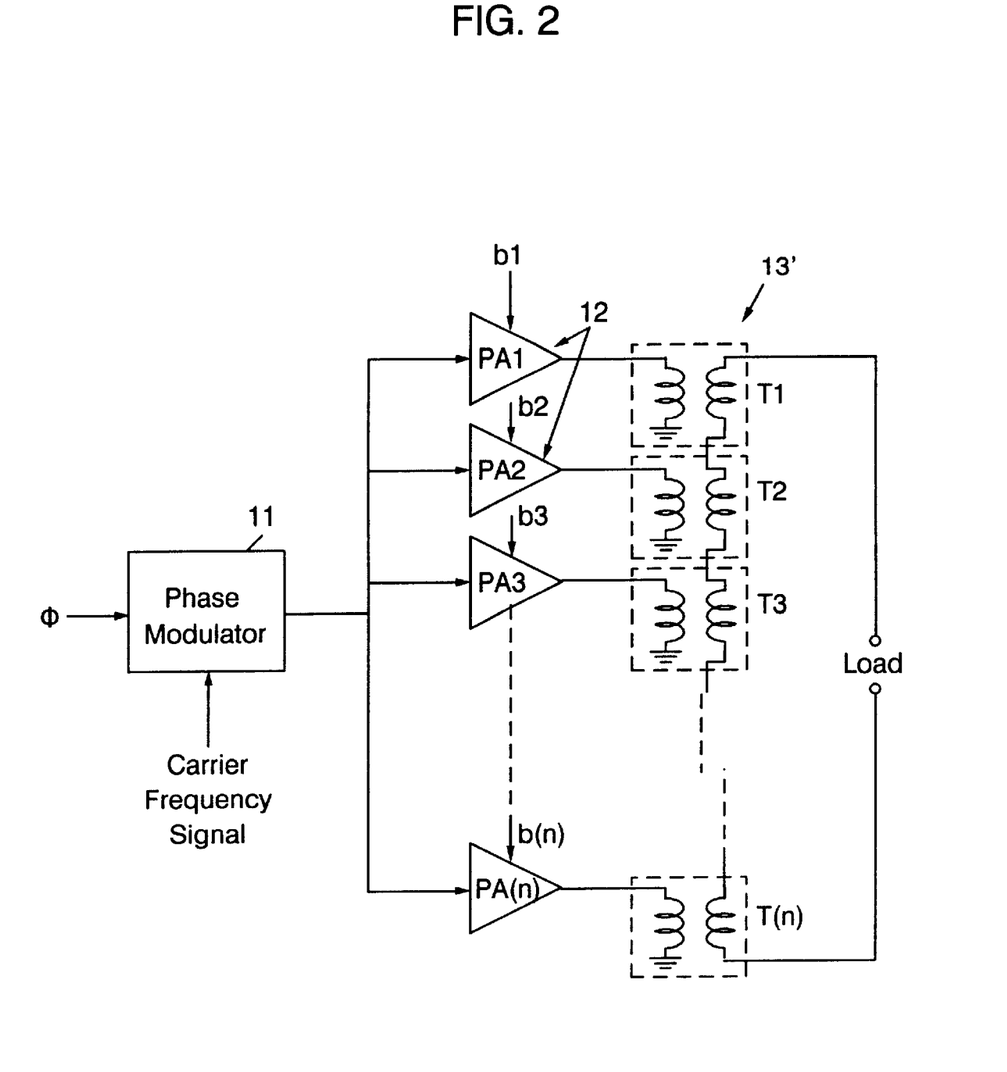
FIGS. 2 and 3 are block diagrams illustrating systems and methods for converting a stream of complex numbers into a modulated radio power signal using respective first and second embodiments of combining circuits according to the present invention.

In FIG. 2, the combining circuit 13' comprises transformers T1, T2, T3 . . . T(n). The primary of each transformer is connected to the output of its respective power amplifier 12. The secondaries of all transformers are connected in series and to the load. For ease of illustration, the DSP 10 is not shown. If all power amplifiers are supplied by the same DC source of voltage Vcc and generate the same saturated voltage swing at their outputs, then to provide combination according to a binary weighting, the primary turns to secondary turns ratio (also referred to as a "combining ratio") of T(i+1) is greater than that of T(i) by a factor of two. For example, T1 can have a 1:1 primary: secondary turns ratio; then T2 has a 2:1 ratio, T3 a 4:1 ratio, etc.

Alternatively, if all power amplifiers are not supplied with the same DC power supply voltage source, but with voltage sources in the ratio 1:1/2:1/4:1/8 . . . then the binary weighting is incorporated into these graded supply voltages and the transformer turns ratios can be equal. A hybrid solution having a portion of the binary weighting in the Vcc ratios and the rest in the transformer ratios can also be provided.

Figure 3:
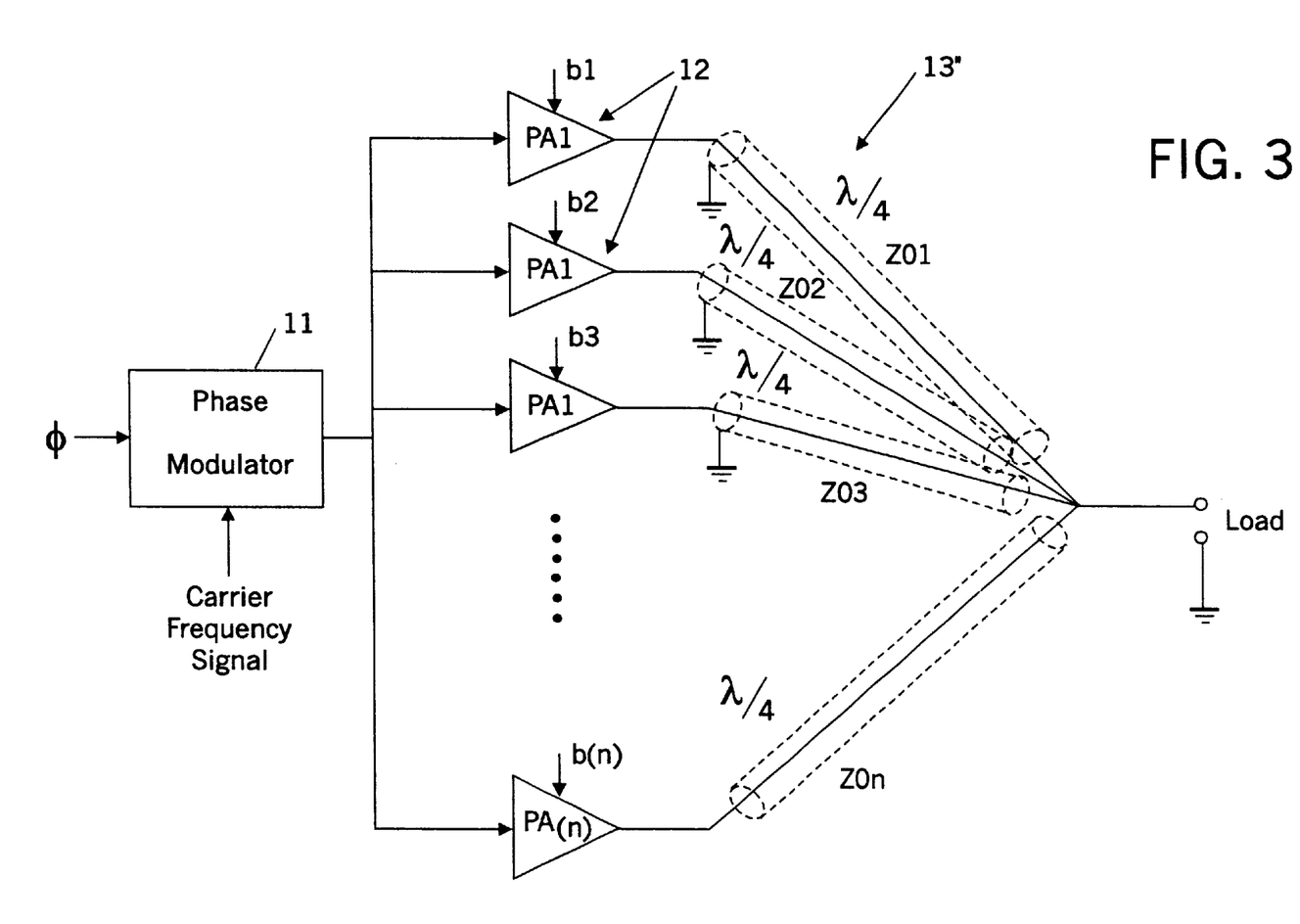

FIG. 3 shows a second preferred combining circuit 13". This embodiment ensures that each power amplifier output device passes the same current waveform by assuring the same voltage one quarter wavelength away. Due to the dual-reciprocal properties of a quarter wave transmission line, $\lambda/4$, if the voltage at one end is defined to be V0, then the current at the other end is determined to be V0/Z0, where Z0 is the characteristic impedance of the line. For ease of illustration, the DSP 10 is not shown.

Thus, if all power amplifiers 12 are fed by the same voltage supply Vcc and generate the same output voltage swing V0, then the currents at the junctions of the quarter wave lines $\lambda/4$ will be V0/Z01 from PA1; V0/Z02 from PA2 . . . and V0/Z0n from PA(n). To ensure that these currents sum in a binary ratio, the line impedances Z01, Z02 . . . Z0n shall therefore bear an increasing power of two ratio to each other, i.e. Z01 Z02: Z03 . . . Z0n=1: 2: 4 . . . $2^n$.

Alternatively, the transmission lines $\lambda/4$ may be of the same impedance and the binary weighting may be obtained by using different Vccs in a decreasing power of two ratio. It is also possible to combine the use of output transformers as in FIG. 2 with quarter-wave lines as in FIG. 3, with or without scaled Vccs, as long as the Vcc for each stage divided by the transformer primary to secondary ratio and divided by the respective line impedance has a 2:1 ratio between successive stages.

The quarter wave lines λ/4 can also be replaced by discrete LC-component equivalents, for example Pi-networks. Each Pi-network can be designed to absorb the output capacitance of its respective power amplifier 12 into the capacitance at one end while the capacitances at the other ends, being connected in parallel at the common junction of the quarter wave lines λ/4, can be replaced by a single capacitor having the sum of their capacitances. The series inductors of the Pi-networks preferably are in proportion to the desired line-equivalent impedances.

The invention can reduce wideband noise amplification in linear transmitters, which can be a problem in prior art transmitters that first generated a low level, linearly modulated signal and then amplified it by a large gain factor. When large gain factors are used, unwanted noise also may be amplified by the large gain factor. In the present invention, high-level modulation may be used for the amplitude modulation part, thereby avoiding wideband noise from this source. To avoid wideband noise from the phase modulation component, a preferred phase modulator, as shown in FIG. 4, can be used.

Figure 4:
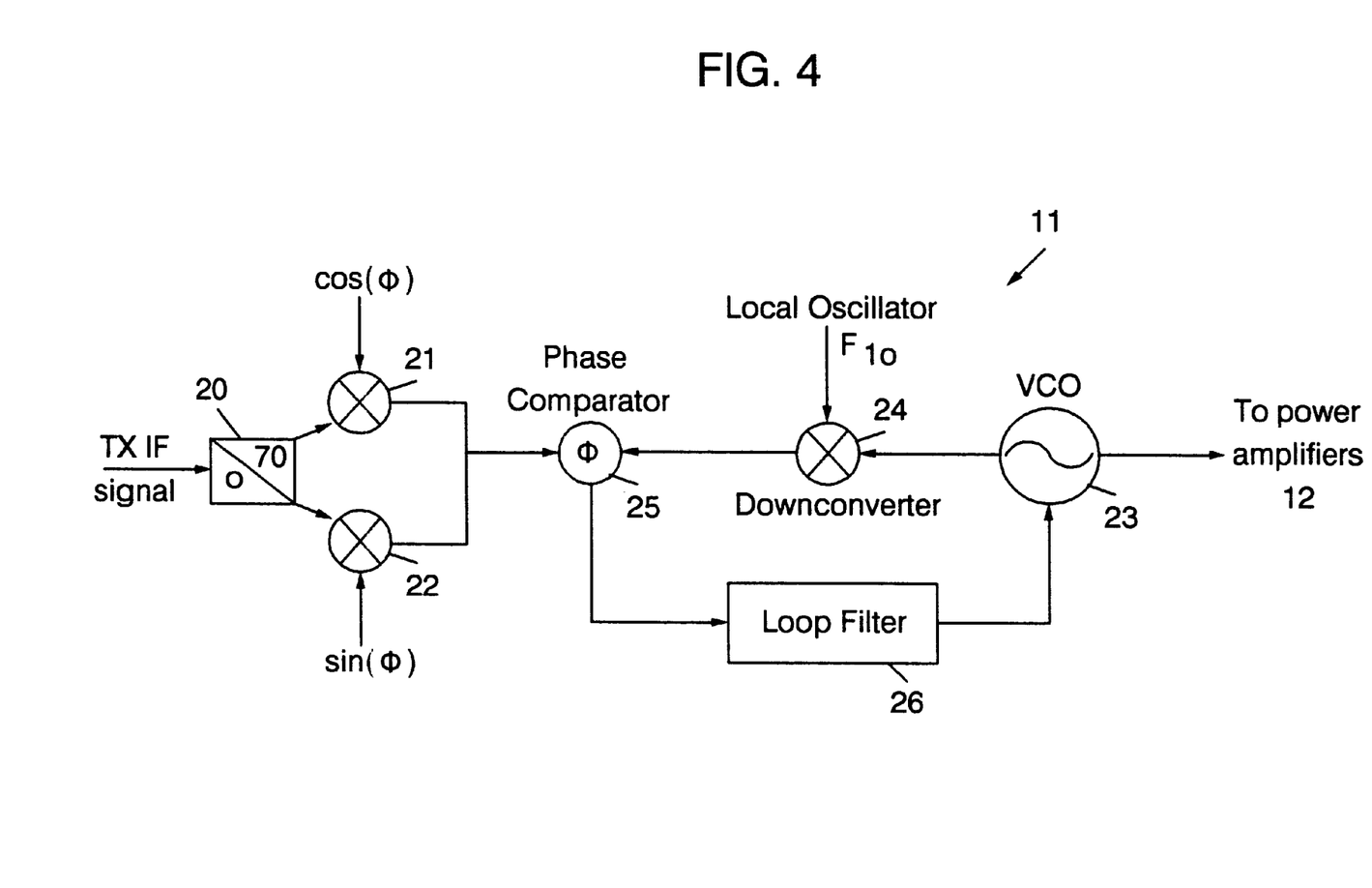
FIG. 4 is a block diagram of an embodiment of a phase modulator of FIGS. 1–3.

Referring now to FIG. 4, a constant frequency signal referred to as the Transmit Intermediate Frequency (TXIF) signal, is supplied to an IQ modulator including a phase splitter 20 and a pair of modulators 21 and 22. The phase splitter 20 generates two TXIF signals 90 degrees apart in phase. Balanced modulator 21 applies the cosine of the phase value φ to the cosine modulator 21 and the sine of φ to the sine modulator. The DSP 10 can directly supply cos φ and sin φ at least as easily as it can supply φ itself.

A controlled oscillator such as a Voltage Controlled Oscillator (VCO) 23 generates a relatively high-level drive signal to power amplifiers 12 so that the power amplifiers can use a relatively low gain factor to bring the power level up to the desired transmit power level. The VCO 23 can be controlled in frequency to the desired transmit channel frequency and modulated in phase in the same way as the TXIF signal.

The signal from the VCO 23 is mixed in a downconvertor 24 with a local oscillator signal of frequency Flo to obtain a difference frequency which should equal TXIF. The difference frequency signal is thus compared in the phase detector 25 with the phase-modulated TXIF signal to generate a phase error signal. The phase error signal is integrated in a loop-filter 26 to produce a frequency control signal for the VCO 23 which forces the phase of the VCO signal to follow the desired modulated phase of the TXIF signal, but now at the desired transmit frequency to be equal to Flo +/− TXIF. The transmit channel frequency can thus be changed by changing Flo, while TXIF remains constant.

The components 23,24,25,26 form at least a second-order phase-lock-loop having a predetermined loop bandwidth. The loop bandwidth determines how rapidly phase changes may be transferred from the modulator to the VCO signal, and therefore can perform a low-pass filtering function that can reduce wideband noise far from the desired transmit frequency.

Unfortunately, many linear modulation waveforms require rather rapid phase variations to be reproduced. Even though a complex vector's Cartesian components X and Y may vary with limited rapidity, the phase can have a rapid variation whenever the vector's trajectory passes close to the origin. In fact, an infinitely rapid change of 180 degrees may be needed if the trajectory passes through the origin. This need for rapid phase changes can prevent the loop bandwidth from being as narrow as might be otherwise desired to reduce wideband noise.

In order to overcome this limitation, in a second implementation, a bipolar control of the amplitude is provided by using control bits b(i) to control PA (i) to produce either a positive amplitude or a negative (phase inverted) output amplitude, as shown in FIG. 5C. A balanced mixer 123 either phase inverts or does not phase invert the drive signal from VCO 23 for example, according to the polarity of the control bit b(i). The DSP 10 then controls the output amplitude among the possible values $$+b(1)+0.5\ b(2)+0.25b(3)\ldots$$

which can now span the range of a maximum positive amplitude when all signs are positive to a maximum negative amplitude when all signs are minus signs.

To reach a given desired vector value of $Ae^{j\phi}$ there is therefore a choice of using $(-A)e^{j(\phi+80)}$. This may be preferable whenever the phase value φ+180 was closer to the previous phase than φ itself, requiring the smallest phase change and therefore the smallest rate-of-change of phase. Thus, it is possible to reduce and preferably minimize the tracking loop bandwidth to reduce wideband noise.

Many other types of phase modulators can be used in conjunction with digital control of amplitude, and other options than on-off or bipolar amplitude control, in particular ternary amplitude control, have already been disclosed in the above-incorporated applications. Briefly, for ternary control, the DSP 10 of FIG. 1 represents the amplitude-representative part of each of the converted complex numbers as a plurality of ternary digits of decreasing numerical significance. The output amplitude of a respective power amplifier 12 is controlled to be either a maximum positive amplitude, a maximum negative amplitude or zero, by applying a respective one of the ternary digits to a respective one of the power amplifiers 12. The amplifier outputs are combined as described above in connection with FIGS. 2 and 3, and a combination of FIGS. 5A and 5C allows ternary control using one of the ternary bits to control the signal and the other to select full or zero amplitudes.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of converting a stream of complex numbers representing a desired modulation of a radio signal into a modulated radio power signal at a radio carrier frequency, the method comprising the steps of:

converting the complex numbers into polar form, including an amplitude-representative part and a phase-representative part;

representing the amplitude-representative part of each of the converted complex numbers as a plurality of digits of decreasing numerical significance;

phase modulating the phase-representative part of each of the converted complex numbers at the radio carrier frequency, to produce a phase-modulated drive signal;

amplifying the phase-modulated drive signal in a plurality of power amplifiers, a respective one of the power amplifiers providing a contribution to the modulated radio power signal at a respective amplifier output that is related to a respective one of the digits of decreasing numerical significance;

controlling the output amplitude of a respective one of the plurality of power amplifiers by applying a respective one of the plurality of digits of decreasing numerical significance to a respective one of the plurality of power amplifiers; and combining the amplifier outputs of the plurality of power amplifiers to form the modulated radio power signal.

2. A method according to claim 1 wherein the combining step comprises the step of applying a respective one of the amplifier outputs to a primary winding of a respective one of a plurality of transformers, the secondary windings of which are series coupled to produce the modulated radio power signal.

3. A method according to claim 1 wherein the combining step comprises the steps of:

applying a respective amplifier output to a respective quarter wave transmission line; and coupling the quarter wave transmission lines to one another to produce the modulated radio power signal.

4. A method according to claim 1 wherein the digits are binary digits such that the step of controlling the output amplitude of a respective one of the plurality of power amplifiers comprises the step of turning a respective one of the plurality of power amplifiers on or off by applying a respective one of the plurality of digits of decreasing numerical significance to a respective one of the plurality of power amplifiers.

5. A method according to claim 1 wherein the step of converting the complex numbers into polar form comprises the step of converting the complex numbers into polar form including an amplitude-representative part having both positive and negative values, and a phase-representative part.

6. A method according to claim 5 wherein the controlling step comprises the step of controlling the output amplitude of a respective one of the plurality of power amplifiers to be either a maximum positive amplitude or a maximum negative amplitude by applying a respective one of the plurality of digits of decreasing numerical significance to a respective one of the plurality of power amplifiers.

7. A method according to claim 1 wherein the digits are ternary digits.

8. A method according to claim 7 wherein the controlling step comprises the step of controlling the output amplitude of a respective one of the plurality of power amplifiers to be either a maximum positive amplitude, a maximum negative amplitude or zero by applying a respective one of the plurality of ternary digits of decreasing numerical significance to a respective one of the plurality of power amplifiers.

9. A method according to claim 1 wherein the phase modulating step comprises the steps of phase modulating a transmit intermediate frequency and using a phase lock loop to transfer the phase modulation to the radio carrier frequency, to produce a phase-modulated drive signal.

10. A method according to claim 1 wherein the relation between the contribution and the numerical significance is provided by using different supply voltages for a respective one of the amplifiers.

11. A method according to claim 2 wherein the relation between the contribution and the numerical significance is provided by using different transformer turns ratios for a respective one of the amplifiers.

12. A method according to claim 3 wherein the relation between the contribution and the numerical significance is provided by using different line characteristic impedances for a respective one of the amplifiers.

13. A method according to claim 1 wherein the relation between the contribution and the numerical significance is provided by using at least one of different supply voltages for respective amplifiers and different transformer turns ratios and different transmission line impedances for combining a respective one of the amplifier outputs.

14. A system for converting a stream of complex numbers representing a desired modulation of a radio signal into a modulated radio power signal at a radio carrier frequency, the system comprising:

a processor that converts the complex numbers into polar form, including an amplitude-representative part and a phase-representative part, and that represents the amplitude-representative part of each of the converted complex numbers as a plurality of digits of decreasing numerical significance;

a phase modulator that modulates the phase-representative part of each of the converted complex numbers at the radio carrier frequency, to produce a phase-modulated drive signal;

a plurality of power amplifiers, a respective one which provides a contribution to the modulated radio power signal at a respective amplifier output that is related to a respective one of the digits of decreasing numerical significance, a respective one of the plurality of digits of decreasing numerical significance being applied to a respective one of the plurality of power amplifiers to thereby control the output amplitude of a respective one of the plurality of power amplifiers; and a combining circuit that combines the amplifier outputs of the plurality of power amplifiers to form the modulated radio power signal.

15. A system according to claim 14 wherein the combining circuit comprises a plurality of transformers each having a primary winding and a secondary winding, a respective primary winding being coupled to a respective power amplifier, the plurality of secondary windings being series coupled to produce the modulated radio power signal.

16. A system according to claim 14 wherein the combining circuit comprises a plurality of quarter wavelength transmission lines, a respective one of which is coupled between a respective power amplifier and an output node to produce the modulated radio power signal at the output node.

17. A system according to claim 14 wherein the digits are binary digits such that a respective one of the plurality of power amplifiers is turned on or off by the respective one of the plurality of digits of decreasing numerical significance that is applied to a respective one of the plurality of power amplifiers.

18. A system according to claim 14 wherein the processor converts the complex numbers into polar form, including an amplitude-representative part having both positive and negative values, and a phase-representative part.

19. A system according to claim 18 wherein the output amplitude of a respective one of the plurality of power amplifiers is controlled to be either a maximum positive amplitude or a maximum negative amplitude by the respective one of the plurality of digits of decreasing numerical significance that is applied to a respective one of the plurality of power amplifiers.

20. A system according to claim 14 wherein the digits are ternary digits and wherein the output amplitude of a respective one of the plurality of power amplifiers is controlled to be either a maximum positive amplitude, a maximum negative amplitude or zero by the respective one of the plurality of ternary digits of decreasing numerical significance that is applied to a respective one of the plurality of power amplifiers.

21. A system according to claim 14 wherein the phase modulator comprises:
an intermediate frequency phase modulator that phase modulates a transmit intermediate frequency; and
a phase lock loop that is responsive to the intermediate frequency phase modulator to transfer the phase modulation to the radio carrier frequency, to produce a phase-modulated drive signal.

22. A system according to claim 14 wherein the relation between the contribution and the numerical significance is provided by using different supply voltages for a respective one of the amplifiers.

23. A system according to claim 15 wherein the relation between the contribution and the numerical significance is provided by using different transformer turns ratios for a respective one of the amplifiers.

24. A system according to claim 16 wherein the relation between the contribution and the numerical significance is provided by using different line characteristic impedances for a respective one of the amplifiers.

25. A system according to claim 14 where the relation between the contribution and the numerical significance is provided by using at least one of different supply voltages for respective amplifiers and different transformer turns ratios and different transmission line impedances for combining a respective one of the amplifier outputs.

26. A system for converting a stream of complex numbers representing a desired modulation of a radio signal into a modulated radio power signal at a radio carrier frequency, the system comprising:
means for converting the complex numbers into polar form, including an amplitude-representative part and a phase-representative part, and for representing the amplitude-representative part of each of the converted complex numbers as a plurality of digits of decreasing numerical significance;
means for phase modulating the phase-representative part of each of the converted complex numbers at the radio carrier frequency, to produce a phase-modulated drive signal;
means for power amplifying the phase-modulated drive signal in a plurality of power amplifiers, a respective one which provides a contribution to the modulated radio power signal at a respective amplifier output that is related to a respective one of the digits of decreasing numerical significance, a respective one of the plurality of digits of decreasing numerical significance being applied to a respective one of the plurality of power amplifiers to thereby control the output amplitude of a respective one of the plurality of power amplifiers; and
means for combining the amplifier outputs of the plurality of power amplifiers to form the modulated radio power signal.

27. A system according to claim 26 wherein the combining means comprises:
means for series combining the plurality of power levels to produce the modulated radio power signal.

28. A system according to claim 26 wherein the combining means comprises:
means for converting the plurality of power levels to a plurality of output currents; and
means for combining the plurality of output currents to produce the modulated radio power signal.

29. A system according to claim 26 wherein the digits are binary digits such that a respective one of the plurality of power amplifiers is turned on or off by the respective one of the plurality of digits of decreasing numerical significance that is applied to a respective one of the plurality of power amplifiers.

30. A system according to claim 26 wherein the means for converting comprises means for converting the complex numbers into polar form, including an amplitude-representative part having both positive and negative values, and a phase-representative part.

31. A system according to claim 30 wherein the output amplitude of a respective one of the plurality of power amplifiers is controlled to be either a maximum positive amplitude or a maximum negative amplitude by the respective one of the plurality of digits of decreasing numerical significance that is applied to a respective one of the plurality of power amplifiers.

32. A system according to claim 26 wherein the digits are ternary digits and wherein the output amplitude of a respective one of the plurality of power amplifiers is controlled to be either a maximum positive amplitude, a maximum negative amplitude or zero by the respective one of the plurality of ternary digits of decreasing numerical significance that is applied to a respective one of the plurality of power amplifiers.

33. A system according to claim 26 wherein the relation between the contribution and the numerical significance is provided by using different supply voltages for a respective one of the amplifiers.

34. A system according to claim 27 wherein the relation between the contribution and the numerical significance is provided by using different transformer turns ratios for a respective one of the amplifiers.

35. A system according to claim 28 wherein the relation between the contribution and the numerical significance is provided by using different line characteristic impedances for a respective one of the amplifiers.

36. A system according to claim 26 wherein the relation between the contribution and the numerical significance is provided by using at least one of different supply voltages for respective amplifiers and different transformer turns ratios and different transmission line impedances for combining a respective one of the amplifier outputs.

37. A system for converting a stream of complex numbers representing a desired modulation of a radio signal into a modulated radio power signal at a radio carrier frequency, the system comprising:
a processor that converts the complex numbers into polar form, including an amplitude-representative part and a phase-representative part, and that represents the amplitude-representative part of each of the converted complex numbers as a plurality of digits of decreasing numerical significance;
a phase modulator that phase modulates the phase-representative part of each of the converted complex numbers at the radio carrier frequency, to produce a phase-modulated drive signal;
a plurality of power amplifiers, a respective one which provides an output voltage level at a respective amplifier output thereof, a respective one of the plurality of digits of decreasing numerical significance being applied to a respective one of the plurality of power amplifiers; and
a combining circuit that combines the amplifier outputs of the plurality of power amplifiers according to a combining ratio to produce the modulated radio power signal, at least one of the output voltage level and the combining ratio being selected such that the modulated radio power signal is related to the numerical significance of the plurality of digits.

38. A system according to claim 37 wherein each of the power amplifiers produces same output voltage level and wherein the combining ratio is selected such that the outputs of the power amplifiers are combined according to a ratio that is related to the numerical significance of the digit that is applied to the respective power amplifier.

39. A system according to claim 37 wherein the combining ratio is unity and wherein the output voltage level of a respective power amplifier is related to the numerical significance of the digit that is applied thereto.

40. A system according to claim 37 wherein both the output voltage level and the combining ratio are selected such that the modulated radio power signal is related to the numerical significance of the plurality of digits.

41. A system according to claim 37 wherein the combining circuit comprises a plurality of transformers each having a primary winding and a secondary winding, a respective primary winding being coupled to a respective power amplifier, the plurality of secondary windings being series coupled to produce the modulated radio power signal.

42. A system according to claim 37 wherein the combining circuit comprises a plurality of quarter wavelength transmission lines, a respective one of which is coupled between a respective power amplifier and an output node to produce the modulated radio power signal at the output node.

43. A system according to claim 37 wherein the digits are binary digits such that a respective one of the plurality of power amplifiers is turned on or off by the respective one of the plurality of digits of decreasing numerical significance that is applied to a respective one of the plurality of power amplifiers.

44. A system according to claim 37 wherein the processor converts the complex numbers into polar form, including an amplitude-representative part having both positive and negative values, and a phase-representative part.

45. A system according to claim 44 wherein the output voltage level of a respective one of the plurality of power amplifiers is controlled to be either a maximum positive voltage level or a maximum negative voltage level by the respective one of the plurality of digits of decreasing numerical significance that is applied to a respective one of the plurality of power amplifiers.

46. A system according to claim 37 wherein the digits are ternary digits and wherein the output voltage level of a respective one of the plurality of power amplifiers is controlled to be either a maximum positive voltage level, a maximum negative voltage level or zero by the respective one of the plurality of ternary digits of decreasing numerical significance that is applied to a respective one of the plurality of power amplifiers.

47. A system for converting a stream of complex numbers representing a desired modulation of a radio signal into a modulated radio power signal at a radio carrier frequency, the system comprising:

means for converting the complex numbers into polar form, including an amplitude-representative part and a phase-representative part, and for representing the amplitude-representative part of each of the converted complex numbers as a plurality of digits of decreasing numerical significance;

means for phase modulating the phase-representative part of each of the converted complex numbers at the radio carrier frequency, to produce a phase-modulated drive signal;

means for power amplifying the phase-modulated drive signal in a plurality of power amplifiers, a respective one which provides an output voltage level at a respective amplifier output, a respective one of the plurality of digits of decreasing numerical significance being applied to a respective one of the plurality of power amplifiers; and means for combining the amplifier outputs of the plurality of power amplifiers according to a combining ratio to produce the modulated radio power signal, at least one of the output voltage level and the combining ratio being selected such that the modulated radio power signal is related to the numerical significance of the plurality of digits.

48. A system according to claim 47 wherein the means for power amplifying comprises means for power amplifying the phase-modulated drive signal to same output voltage level in the plurality of power amplifiers, and wherein the combining ratio is selected such that the amplifier outputs are combined according to a ratio that is related to the numerical significance of the digits that are associated with the respective phase modulated output.

49. A system according to claim 47 wherein the combining ratio is unity and wherein the respective output voltage levels are related to the numerical significance of the digits that are associated therewith.

50. A system according to claim 47 wherein both the respective output voltage level and the combining ratio are selected such that the modulated radio power signal is related to the numerical significance of the plurality of digits.

51. A system according to claim 47 wherein the combining means comprises:

means for series combining the plurality of power levels to produce the modulated radio power signal.

52. A system according to claim 47 wherein the combining means comprises:

means for converting the plurality of amplifier output voltage levels to a plurality of amplifier output currents; and means for combining the plurality of amplifier output currents to produce the modulated radio power signal.

53. A system according to claim 47 wherein the digits are binary digits such that a respective one of the plurality of power amplifiers is turned on or off by the respective one of the plurality of digits of decreasing numerical significance that is applied to a respective one of the plurality of power amplifiers.

54. A system according to claim 47 wherein the means for converting comprises means for converting the complex numbers into polar form, including an amplitude-representative part having both positive and negative values, and a phase-representative part.

55. A system according to claim 54 wherein the output voltage level of a respective one of the plurality of power amplifiers is controlled to be either a maximum positive voltage level or a maximum negative voltage level by the respective one of the plurality of digits of decreasing numerical significance that is applied to a respective one of the plurality of power amplifiers.

56. A system according to claim 47 wherein the digits are ternary digits and wherein the output voltage level of a respective one of the plurality of power amplifiers is controlled to be either a maximum positive voltage level, a maximum negative voltage level or zero by the respective one of the plurality of ternary digits of decreasing numerical significance that is applied to a respective one of the plurality of power amplifiers.

57. A method for converting a stream of complex numbers representing a desired modulation of a radio signal into a modulated radio power signal at a radio carrier frequency, the method comprising the steps of:

- converting the complex numbers into polar form, including an amplitude-representative part and a phase-representative part;
- representing the amplitude-representative part of each of the converted complex numbers as a plurality of digits of decreasing numerical significance;
- phase modulating the phase-representative part of each of the converted complex numbers at the radio carrier frequency, to produce a phase-modulated drive signal;
- power amplifying the phase-modulated drive signal in a plurality of power amplifiers, a respective one which provides an output voltage level at a respective amplifier output;
- applying a respective one of the plurality of digits of decreasing numerical significance to a respective one of the plurality of power amplifiers; and
- combining the amplifier outputs of the plurality of power amplifiers according to a combining ratio to produce the modulated radio power signal, at least one of the output voltage level and the combining ratio being selected such that the modulated radio power signal is related to the numerical significance of the plurality of digits.

58. A method according to claim 57 wherein the power amplifying step comprises the step of power amplifying the phase-modulated drive signal to same output voltage level in the plurality of power amplifiers, and wherein the combining ratio is selected such that the amplifier outputs are combined according to a ratio that is related to the numerical significance of the digits that are associated with the respective phase modulated output.

59. A method according to claim 57 wherein the combining ratio is unity and wherein the respective output voltage levels are related to the numerical significance of the digits that are associated therewith.

60. A method according to claim 57 wherein both the respective output voltage levels and the combining ratio are selected such that the modulated radio power signal is related to the numerical significance of the plurality of digits.

* * * * *